US012542990B2

(12) United States Patent
Tao et al.

(10) Patent No.: US 12,542,990 B2
(45) Date of Patent: Feb. 3, 2026

(54) ACOUSTIC TRANSDUCER AND MANUFACTURING METHOD THEREOF

(71) Applicant: BOE TECHNOLOGY GROUP CO., LTD., Beijing (CN)

(72) Inventors: Yongchun Tao, Beijing (CN); Yichi Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1426 days.

(21) Appl. No.: 17/259,241

(22) PCT Filed: Mar. 30, 2020

(86) PCT No.: PCT/CN2020/081996
§ 371 (c)(1),
(2) Date: Jan. 11, 2021

(87) PCT Pub. No.: WO2021/195826
PCT Pub. Date: Oct. 7, 2021

(65) Prior Publication Data

US 2022/0141565 A1 May 5, 2022

(51) Int. Cl.
*H04R 1/04* (2006.01)
*B06B 1/02* (2006.01)

(52) U.S. Cl.
CPC ............. *H04R 1/04* (2013.01); *B06B 1/0207* (2013.01)

(58) Field of Classification Search
CPC ........ H04R 1/04; B06B 1/0207; B06B 1/0292
See application file for complete search history.

(56) References Cited

U.S. PATENT DOCUMENTS 8,048,628 B2 * 11/2011 Pollack ................ G01N 27/447 435/6.12
9,475,093 B2 10/2016 Hajati et al.
2005/0237858 A1 10/2005 Thomenius et al.
(Continued)

FOREIGN PATENT DOCUMENTS

CN 1794479 A 6/2006
CN 105492129 A 4/2016
(Continued)

OTHER PUBLICATIONS

China Patent Office, First Office Action dated Apr. 18, 2022, for corresponding Chinese application 202080000427.5.

*Primary Examiner* — Isam A Alsomiri
*Assistant Examiner* — Sanjida Naser
(74) *Attorney, Agent, or Firm* — HOUTTEMAN LAW LLC

(57) ABSTRACT

The present disclosure provides an acoustic transducer, including: a base substrate and a plurality of acoustic transducer elements located on the base substrate. The acoustic transducer element includes: a switch and an acoustic transducer unit. A first terminal of the switch is electrically connected to a control signal line, and a second terminal of the switch is electrically connected to the acoustic transducer unit located in the same acoustic transducer element as the switch. The switch is configured to control connection and disconnection between the acoustic transducer unit located in the same acoustic transducer element as the switch and the control signal line. An embodiment of the present disclosure further provides a method for manufacturing the acoustic transducer.

15 Claims, 10 Drawing Sheets

(56) References Cited

U.S. PATENT DOCUMENTS

| | | | | |
|---|---|---|---|---|
| 2015/0290679 | A1 * | 10/2015 | Kandori | G10K 11/004<br>367/181 |
| 2016/0199030 | A1 * | 7/2016 | Patil | A61B 8/4411<br>600/459 |
| 2016/0293154 | A1 * | 10/2016 | Yang | G10K 11/172 |
| 2018/0243792 | A1 | 8/2018 | Rothberg et al. | |

FOREIGN PATENT DOCUMENTS

| | | | | | |
|---|---|---|---|---|---|
| CN | 105592942 | A | * | 5/2016 | B06B 1/0622 |
| KR | 20190083407 | A | | 7/2019 | |
| TW | 201834025 | A | | 9/2018 | |

* cited by examiner

ACOUSTIC TRANSDUCER AND MANUFACTURING METHOD THEREOF

TECHNICAL FIELD

The technical solutions of the present disclosure relate to an acoustic transducer and a manufacturing method thereof.

BACKGROUND

Ultrasonic testing has been applied in many fields, such as medical imaging, medical treatment, industrial flowmeters, automotive radars, and indoor positioning. An acoustic transducer is a device used for ultrasonic testing, and generally includes a plurality of acoustic transducer elements arranged in an array. In the related art, each of the acoustic transducer elements needs to be provided with an independent external signal processing circuit (generally including a signal generator and a low noise amplifier). The external signal processing circuit is configured to send a control signal to a corresponding acoustic transducer element, and receive and process an electrical signal output from the corresponding acoustic transducer element.

With an increase of the number of the acoustic transducer elements in the acoustic transducer, the number of the external signal processing circuits included in an application specific integrated circuit (ASIC) of the acoustic transducer is increased too, so that the complexity and cost of the ASIC are increased accordingly.

SUMMARY

The embodiments of the present disclosure provide an acoustic transducer and a manufacturing method thereof.

As a first aspect, an acoustic transducer is provided in an embodiment of the disclosure. The acoustic transducer includes: a base substrate and a plurality of acoustic transducer elements on the base substrate. The acoustic transducer element includes a switch and an acoustic transducer unit. A first terminal of the switch is electrically connected to a control signal line, and a second terminal of the switch is electrically connected to the acoustic transducer unit, wherein the switch and the acoustic transducer unit are located in the same acoustic transducer element. The switch is configured to control connection and disconnection between the acoustic transducer unit and the control signal line, with the switch and the acoustic transducer unit formed in the same acoustic transducer element.

In some embodiments, the acoustic transducer further includes an external signal processing circuit; and the first terminal of the switch is connected to a single/same external signal processing circuit through the control signal line.

In some embodiments, the switch comprises a MEMS switch, the MEMS switch includes: a first support pattern on the base substrate and defining an enclosed first vibration cavity; a first vibration film on a side of the first support pattern distal to the base substrate; a first transmission electrode and a second transmission electrode on a side of the base substrate proximal to the first vibration film, spaced apart from each other, and electrically connected to the first terminal and the second terminal of the switch respectively; a conductive bridge on a side of the first vibration film proximal to the base substrate; a first control electrode on a side of the first vibration film distal to the base substrate; a second control electrode in the first vibration cavity, and configured to pull the first control electrode down when a driving voltage is applied to second control electrode, so as to drive the first vibration film and the conductive bridge to move such that the conductive bridge is in contact with the first and second transmission electrodes.

In some embodiments, the first transmission electrode, the second transmission electrode, and the second control electrode are in a same layer.

In some embodiments, the second control electrode includes a first sub-electrode and a second sub-electrode arranged along a first direction and spaced apart from each other. The first and second transmission electrodes are arranged along a second direction and are between the first sub-electrode and the second sub-electrode.

In some embodiments, a first via and a second via are in portions of the base substrate corresponding to the first transmission electrode and the second transmission electrode respectively, and a first conductive lead wire and a second conductive lead wire are in the first via and the second via respectively. One end of the first conductive lead wire is connected to the first transmission electrode, and the other end of the first conductive lead wire extends onto a surface of the base substrate distal to the first transmission electrode. One end of the second conductive lead wire is connected to the second transmission electrode, and the other end of the second conductive lead wire extends onto a surface of the base substrate distal to the second transmission electrode.

In some embodiments, a third via is in a portion of the base substrate corresponding to the second control electrode, a third conductive lead wire is in the third via, one end of the third conductive lead wire is connected to the second control electrode, and the other end of the third conductive lead wire extends onto a surface of the base substrate distal to the second control electrode.

In some embodiments, the acoustic transducer unit includes: a second support pattern on the base substrate and defining an enclosed second vibration cavity; a second vibration film on a side of the second support pattern distal to the base substrate; a top electrode on a side of the second vibration film distal to the base substrate; and a bottom electrode in the second vibration cavity and electrically connected to the second terminal of the switch.

In some embodiments, the switch includes a MEMS switch. The MEMS switch includes: a first support pattern, a first vibration film, a first transmission electrode, a second transmission electrode, a conductive bridge, a first control electrode and a second control electrode The first support pattern is in the same layer as the second support pattern; the first vibration film is in the same layer as the second vibration film; the first and second transmission electrodes, the second control electrode and the bottom electrode are in a same layer; and the first control electrode is in the same layer as the top electrode.

In some embodiments, a fourth via is in a portion of the base substrate corresponding to the bottom electrode, a fourth conductive lead wire is in the fourth via, one end of the fourth conductive lead wire is connected to the bottom electrode, and the other end of the fourth conductive lead wire extends onto a surface of the base substrate distal to the bottom electrode.

In some embodiments, the acoustic transducer unit further includes at least one protrusion on a surface of the second vibration film proximal to the base substrate.

In some embodiments, the protrusion has a shape of a ring in a cross-section view parallel to the base substrate, and the top electrode is in a region defined by the ring; or the acoustic transducer unit includes a plurality of protrusions, each of plurality of protrusions has a shape of circular in a cross-section view parallel to the base substrate, the plurality of protrusions are arranged along a ring, and the top electrode is in a region defined by the ring.

As a second aspect, a method for manufacturing the acoustic transducer according to the first aspect is provided in an embodiment of the disclosure. The method includes: forming the switch and the acoustic transducer unit on the base substrate.

In some embodiments, the switch includes a MEMS switch. The MEMS switch includes: a first support pattern, a first vibration film, a first transmission electrode, a second transmission electrode, a conductive bridge, a first control electrode and a second control electrode. The acoustic transducer unit includes a second support pattern, a second vibration film, a top electrode and a bottom electrode. Forming the switch and the acoustic transducer unit on the base substrate includes: forming patterns of the first transmission electrode, the second transmission electrode, the second control electrode, and the bottom electrode on the base substrate; forming a pattern of a first sacrificial layer on a side of the first transmission electrode, the second transmission electrode, the second control electrode and the bottom electrode distal to the base substrate; forming a pattern of a second sacrificial layer on a side of the first sacrificial layer distal to the base substrate; forming a first groove for subsequently accommodating a conductive bridge in the second sacrificial layer; forming a pattern of the conductive bridge in the first groove; forming the first support pattern and the second support pattern on the base substrate; forming a pattern of the first vibration film on a side of the first support pattern distal to the base substrate, and forming a pattern of the second vibration film on a side of the second support pattern distal to the base substrate; forming a first release hole in the first vibration film, and forming a second release hole in the second vibration film; removing the first sacrificial layer and the second sacrificial layer through the first release hole to form a first vibration cavity and a second vibration cavity; filling a first filling pattern in the first release hole, and filling a second filling pattern in the second release hole; and forming the first control electrode on a side of the first vibration film distal to the base substrate, and forming the top electrode on a side of the second vibration film distal to the base substrate.

In some embodiments, the acoustic transducer unit further includes a protrusion. The method further comprises: forming a second groove for subsequently accommodating the protrusion in the second sacrificial layer during a formation of the pattern of the second sacrificial layer; forming the pattern of the first vibration film on the side of the first support pattern distal to the base substrate, and forming the pattern of the second vibration film on the side of the second support pattern distal to the base substrate further includes forming the protrusion in the second groove.

In some embodiments, before forming the patterns of the first transmission electrode, the second transmission electrode, the second control electrode, and the bottom electrode on the base substrate, the method further includes: forming a first via, a second via, a third via and a fourth via in portions of the base substrate corresponding to the first transmission electrode, the second transmission electrode, the second control electrode and the bottom electrode to be formed; and forming a first conductive lead wire, a second conductive lead wire, a third conductive lead wire and a fourth conductive lead wire in the first via, the second via, the third via and the fourth via respectively, such that each of two ends of the first conductive lead wire, two ends of the second conductive lead wire, two ends of the third conductive lead wire, and two ends of the fourth conductive lead wire extend onto two opposite surfaces of the base substrate respectively.

DETAILED DESCRIPTION

In order to enable those skilled in the art to better understand the technical solutions of the present disclosure, an acoustic transducer and a manufacturing method thereof provided by the present disclosure are described in detail below with reference to the accompanying drawings.

Ultrasound, which refers to sound waves with frequencies of 20 kHz to 1 GHz, is taken as an example of sound waves in the following description of the embodiments. It should be noted that the technical solutions of the present disclosure are also applicable to sound waves with other frequencies.

Figure 1:
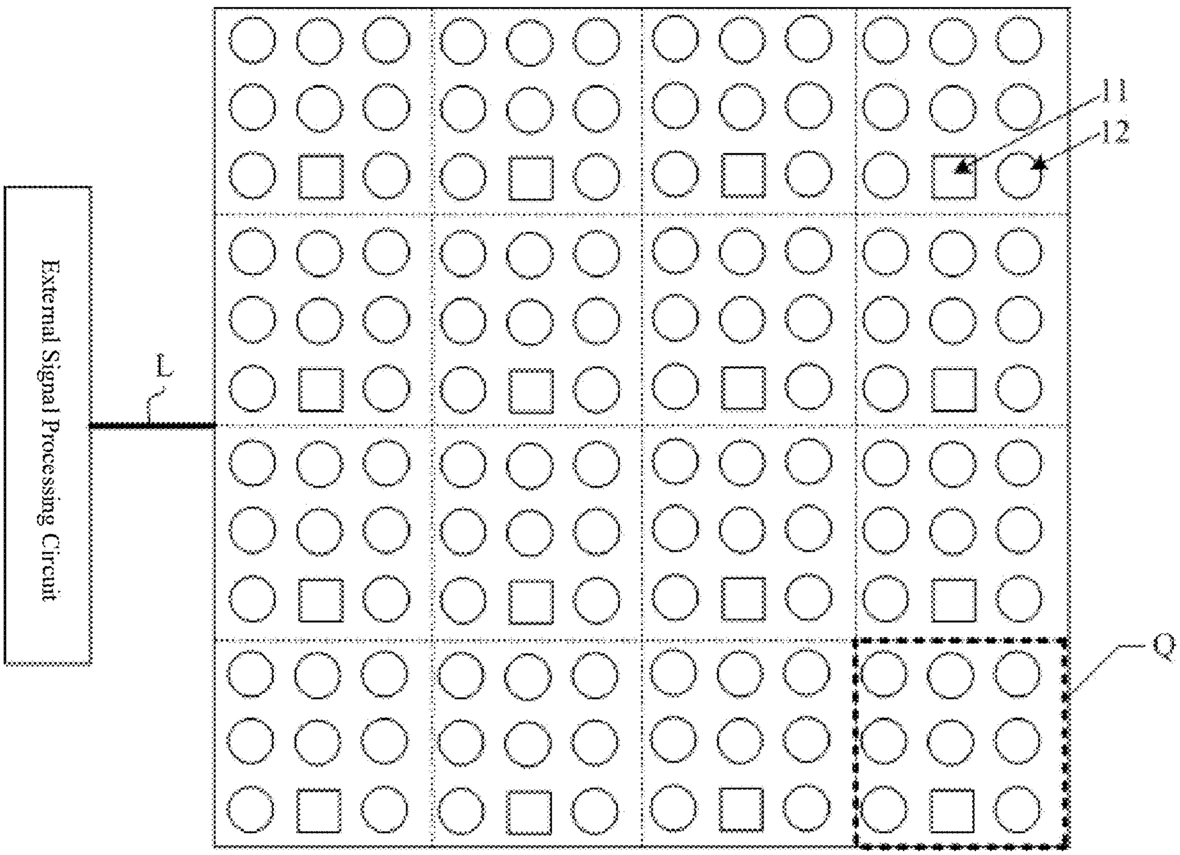
FIG. 1 is a top view of an acoustic transducer according to an embodiment of the present disclosure.
Figure 2:
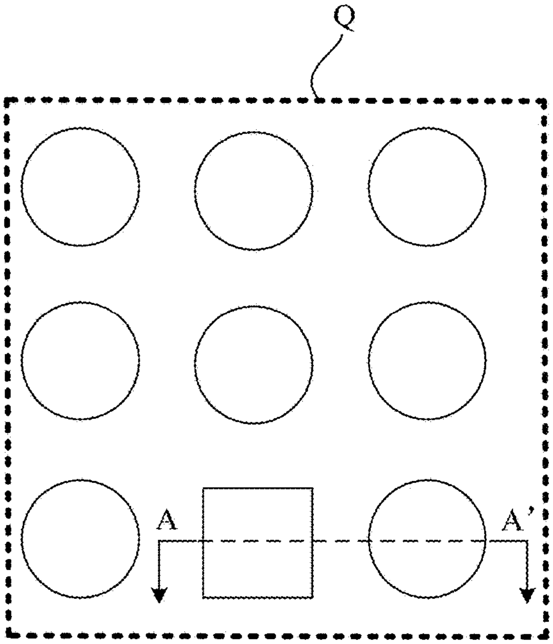
FIG. 2 is a method schematic diagram of a region corresponding to an acoustic transducer element Q shown in FIG. 1.
Figure 3:
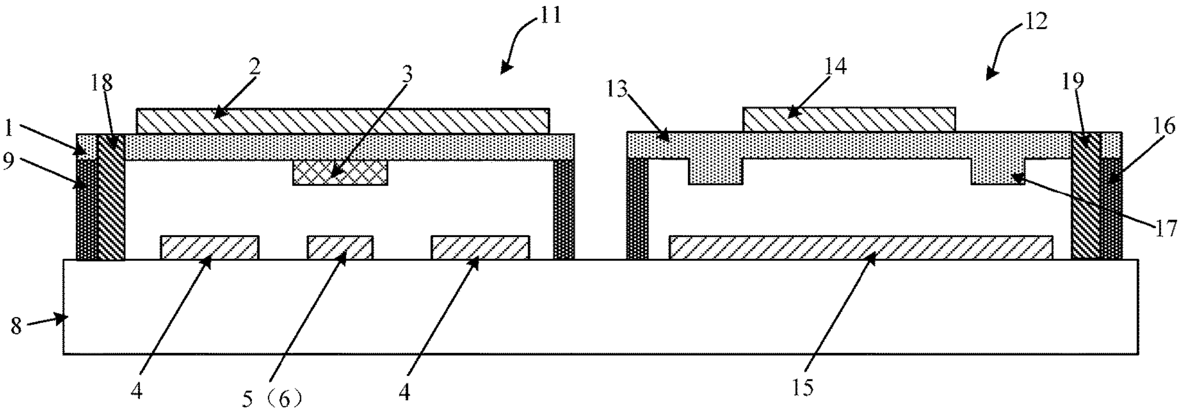
FIG. 3 is a sectional view taken along line A-A' of FIG. 2.

FIG. 1 is a top view showing an acoustic transducer according to an embodiment of the present disclosure. FIG. 2 is a method schematic diagram showing a region corresponding to an acoustic transducer element Q shown in FIG. 1. FIG. 3 is a sectional view taken along line A-A' of FIG. 2. As shown in FIGS. 1 to 3, an acoustic transducer includes: an acoustic transducer substrate. The acoustic transducer substrate includes a base substrate 8 and a plurality of acoustic transducer elements Q located on the base substrate 8 and arranged in array. Each of the acoustic transducer elements Q includes a switch 11 and at least one acoustic transducer unit 12.

A first terminal of the switch 11 is electrically connected to a control signal line L, and a second terminal of the switch 11 is electrically connected to the acoustic transducer unit 12, wherein the switch 11 and the acoustic transducer unit 12 are located in the same acoustic transducer element. The switch 11 is configured to control connection and disconnection between the acoustic transducer unit 12 and the control signal line L, wherein the acoustic transducer unit 12 and the switch 11 are located in the same acoustic transducer element Q.

In the embodiment of the present disclosure, gating of the acoustic transducer elements Q in the two-dimensional array may be realized by providing the switches 11 in the acoustic transducer elements Q, so that separate acoustic transducer elements Q on the acoustic transducer substrate can share a single control signal line L and a single external signal processing circuit, thereby effectively decreasing the number of the external signal processing circuits included in the ASIC, and further reducing the complexity and cost of the ASIC correspondingly.

In some embodiments, all of the acoustic transducer elements Q on the acoustic transducer substrate are connected to a single external signal processing circuit through the control signal line L, that is, the first terminals of all the switches are connected to a single external signal processing circuit through the control signal line L. In such case, only one external signal processing circuit is provided in the ASIC.

In some embodiments, the switch is a micro-electro-mechanical system (MEMS) switch, which can ensure the communication speed between the acoustic transducer element Q and the external signal processing circuit. MEMS switches are a specific application of MEMS technology and have significant advantages over other switching technologies. Specifically, as compared with other mechanical relays (e.g. electromechanical relays and reed relays), the MEMS switches have the advantages such as smaller size, lower insertion loss, larger bandwidth, and faster switching speed; and as compared with semiconductor switches (e.g. field effect transistors and PIN diodes), the MEMS switches have the advantages such as lower insertion loss, higher linearity, larger bandwidth (i.e., operating under a full DC condition), and better power handling performance.

Figure 4:
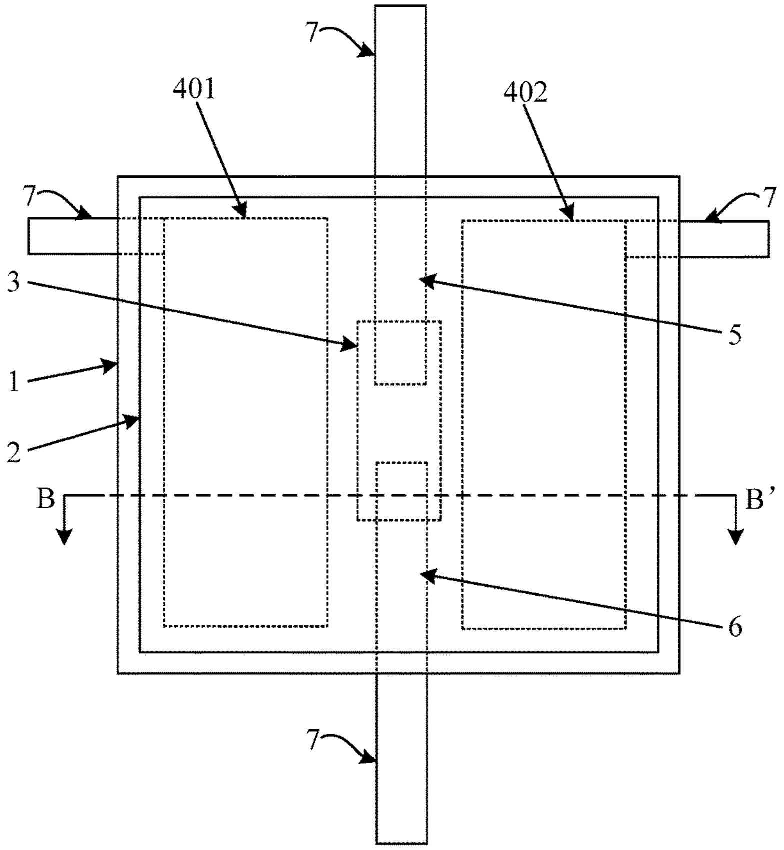
FIG. 4 is a top perspective view showing a MEMS switch according to an embodiment of the present disclosure.
Figure 5:
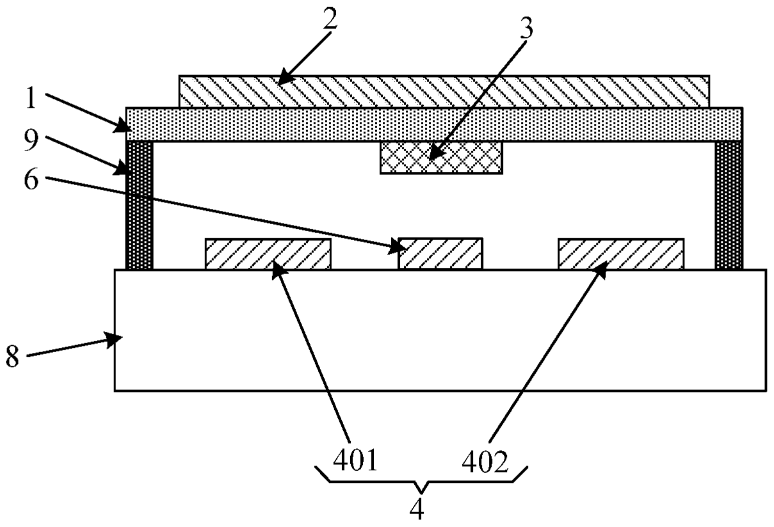
FIG. 5 is a sectional view taken along line B-B' of FIG. 4.
Figure 6:
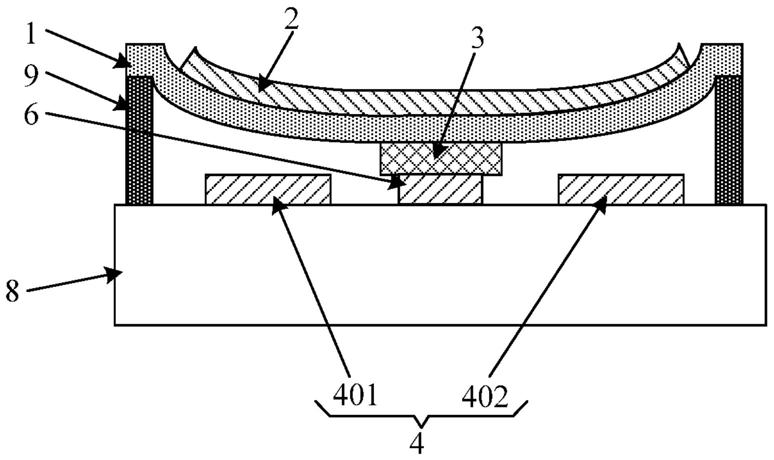
FIG. 6 is a sectional view illustrating that a conductive bridge is in contact with a first transmission electrode and a second transmission electrode.

FIG. 4 is a top perspective view showing a MEMS switch according to an embodiment of the present disclosure. FIG. 5 is a sectional view taken along line B-B' of FIG. 4. FIG. 6 is a sectional view illustrating that a conductive bridge is in contact with a first transmission electrode and a second transmission electrode. As shown in FIGS. 4 to 6, a MEMS switch includes: a first support pattern 9, a first vibration film 1, a first transmission electrode 5, a second transmission electrode 6, a conductive bridge 3, a first control electrode 2, and a second control electrode 4.

The first support pattern 9 is located on the base substrate 8 and defines an enclosed first vibration cavity. The first vibration film 1 is located on a side of the first support pattern 9 distal to the base substrate 8. The first transmission electrode 5 and the second transmission electrode 6 are located on a side of the base substrate 8 proximal to the first vibration film 1, are separated from each other, and are electrically connected to the first terminal and the second terminal of the switch, respectively. The conductive bridge 3 is located on a side of the first vibration film 1 proximal to the base substrate 8. The first control electrode 2 is located on a side of the first vibration film 1 distal to the base substrate 8, and the second control electrode 4 is located in the first vibration cavity. The second control electrode 4 is configured to pull the first control electrode 2 down when a driving voltage is applied to second control electrode 4, so as to drive the first vibration film 1 and the conductive bridge 3 to move, so that the conductive bridge 3 is in contact with the first transmission electrode 5 and the second transmission electrode 6, respectively.

In some embodiments, the base substrate 8 may be a glass substrate, which is beneficial to the manufacture of large array MEMS devices. The base substrate 8 in the embodiments of the present disclosure may also be other types of substrates, such as a ceramic substrate and a silicon wafer substrate.

In an embodiment of the present disclosure, the MEMS switch has an "OFF" state and an "ON" state, wherein the "OFF" state refers to the electrical disconnection between the first transmission electrode 5 and the second transmission electrode 6, and the "ON" state refers to an electrical connection between the first transmission electrode 5 and the second transmission electrode 6. Specifically, the first control electrode 2 serves as a movable electrode, the second control electrode 4 serves as a fixed electrode. The first control electrode 2 and the second control electrode 4 form a capacitive structure.

In practical application, the first control electrode 2 is applied with a constant voltage or is grounded. With reference to FIG. 2, no driving voltage is applied to the second control electrode 4 in an initial state, the conductive bridge 3 is separated from the first transmission electrode 5 and the second transmission electrode 6, so that the first transmission electrode 5 and the second transmission electrode 6 are disconnected from each other, that is to say, the MEMS switch is in the "OFF" state. When a driving voltage (specifically, a DC bias voltage) is applied to the second control electrode 4, the first control electrode 2 is pulled down towards the second control electrode 4 under the action of an electrostatic force, meanwhile, the first control electrode 2 drives the first vibration film 1 and the conductive bridge 3 to move correspondingly, so that the first transmission electrode 5 and the second transmission electrode 6 are electrical connected to each other, that is to say, the MEMS switch is in the "ON" state. After the driving voltage is removed, the first vibration film 1 gradually restores to the initial state under the action of its own elastic force, and meanwhile, the conductive bridge 3 is separated from the first transmission electrode 5 and the second transmission electrode 6, so that the first transmission electrode 5 and the second transmission electrode 6 are electrical disconnected from each other.

In some embodiments, the first transmission electrode 5, the second transmission electrode 6, and the second control electrode 4 are formed in the same layer. It should be noted that, in the embodiments of the present disclosure, "being formed in the same layer" referred being made from the same material film by a patterning process, and the distances between different structures that are disposed on the same layer and the base substrate 8 may be the same (see FIGS. 2 and 3) or different (not shown) from each other. In the embodiments of the present disclosure, in order to ensure that the conductive bridge 3 can be in contact with the first transmission electrode 5 and the second transmission electrode 6 simultaneously, it is preferred that a distance between a surface of the first transmission electrode 5 distal to the base substrate 8 and the base substrate 8 is designed to equal a distance between an a surface of the second transmission electrode 6 distal to the base substrate 8 and the base substrate 8.

In some embodiments, the second control electrode 4 includes: a first sub-electrode and a second sub-electrode 402, which are arranged along a first direction and are spaced apart from each other. The first transmission electrode 5 and the second transmission electrode 6 are arranged along a second direction and located between the first sub-electrode 401 and the second sub-electrode 402. With such arrangement, the first sub-electrode 401, the second sub-electrode 402, the first transmission electrode 5 and the second transmission electrode 6 can be located in the same plane, which facilitates decreasing an overall thickness of the MEMS switch. In addition, the first sub-electrode 401 and the second sub-electrode 402 are designed to be symmetrical to each other, in order to ensure that the first control electrode 2 can be parallel to the base substrate 8 all the time during the first control electrode 2 is pulled down.

Figure 7:
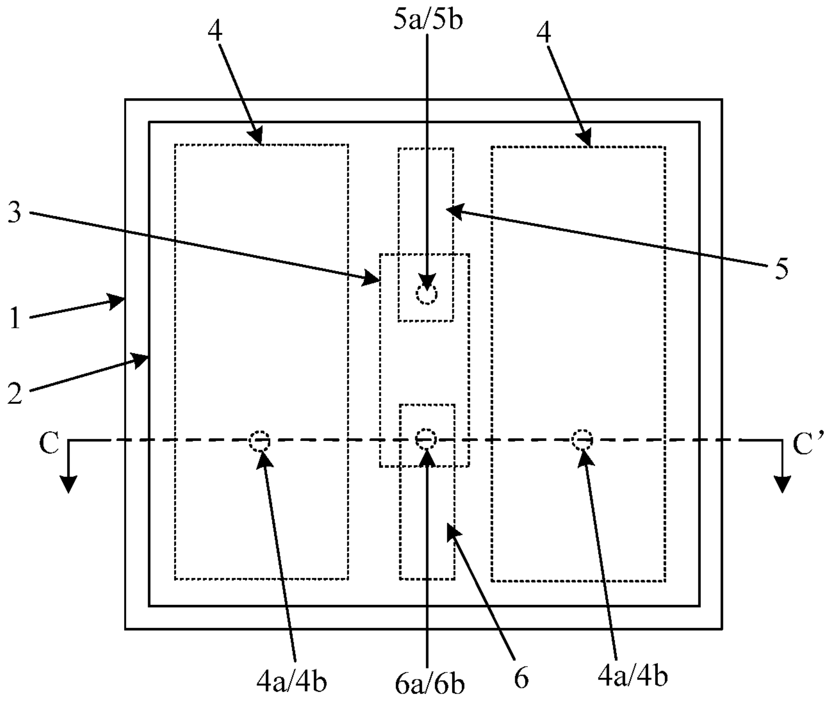
FIG. 7 is a top perspective view showing a MEMS switch according to another embodiment of the present disclosure.
Figure 8:
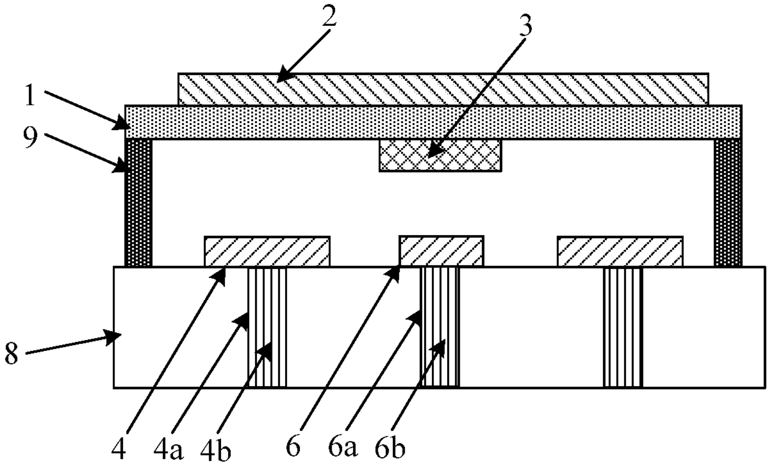
FIG. 8 is a sectional view taken along line C-C' of FIG. 7.

FIG. 7 is a top perspective view of a MEMS switch according to another embodiment of the present disclosure, and FIG. 8 is a sectional view taken along line C-C' of FIG. 7. In an embodiment, as shown in FIGS. 4 and 5, all of lead wires, which are located on a front surface (on which the MEMS switch is formed) of the base substrate 8, of the second control electrode 4, the first transmission electrode 5, and the second transmission electrode 6, which are located in the first vibration cavity, extend out of the first vibration cavity, so as to facilitate loading of signals. According to the embodiments of the present disclosure, as shown in FIGS. 7 and 8, the second control electrode 4, the first transmission electrode 5, and the second transmission electrode 6 located in the first vibration cavity are led to a back surface (opposite to the front surface) of the base substrate 8 through the vias formed in the base substrate 8.

Specifically, a first via 5*a* and a second via 6*a* are formed in portions of the base substrate 8 corresponding to the first transmission electrode 5 and the second transmission electrode 6, respectively. A first conductive lead wire 5*b* and a second conductive lead wire 6*b* are formed in the first via 5*a* and the second via 6*a*, respectively. One end of the first conductive lead wire 5*b* is connected to the first transmission electrode 5, and the other end of the first conductive lead wire 5*b* extends onto a surface of the base substrate 8 distal to the first transmission electrode 5. One end of the second conductive lead wire 6*b* is connected to the second transmission electrode 6, and the other end of the second conductive lead wire 6*b* extends onto a surface of the base substrate 8 distal to the second transmission electrode 6.

A third via 4*a* is formed in a portion of the base substrate 8 corresponding to the second control electrode 4. A third conductive lead wire 4*b* is formed in the third via 4*a*. One end of the third conductive lead wire 4*b* is connected to the second control electrode 4, and the other end of the third conductive lead wire 4*b* extends onto a surface of the base substrate 8 distal to the second control electrode 4.

In the case where the base substrate 8 is a glass substrate, the vias may be formed by a Through Glass Via (TGV) process. In the case where the base substrate 8 is a silicon wafer substrate, the vias may be formed by a Through Silicon Via (TSV) process. The first conductive lead wire 5*b*, the second conductive lead wire 6*b* and the third conductive lead wire 4*b* may be formed by depositing a metal material in the vias.

In the embodiments of the present disclosure, since the first transmission electrode 5, the second transmission electrode 6, and the second control electrode 4 can be led out to the back surface of the base substrate 8 through the conductive vias formed in the base substrate 8, the MEMS switches may be subsequently packaged through Ball Grid Array (BGA) technology, thereby decreasing a length of the lead wire, reducing the parasitic effect, and facilitating an increase of the response rates of the MEMS switches.

It should be understood by those skilled in the art that only one of the first vias 5*a*, the second vias 6*a*, and the third vias 4*a* is formed on the base substrate 8, or alternatively any two of the first vias 5*a*, the second vias 6*a*, and the third vias 4*a* are formed on the base substrate 8, in this case, the response rates of the MEMS switches can be increased to some extent, and those technical solutions should fall within the scope of the present disclosure.

The first transmission electrode 5 of the MEMS switch 11 is configured to be electrically connected to a control signal line, and the second transmission electrode 6 of the MEMS switch 11 is configured to be electrically connected to a signal input terminal of the acoustic transducer unit 12. A control signal provided by the control signal line can be transmitted to the acoustic transducer unit 12 through the MEMS switch 11 to control the acoustic transducer unit 12 to operate. An electrical signal generated by the acoustic transducer unit 12 after receiving sound waves can be transmitted to the control signal line through the MEMS switch 11 for being read by an external chip. The processes of providing the control signal by the control signal line and providing the electrical signal generated by the acoustic transducer unit 12 to the external chip belong to conventional technical means in the art, and will not be described herein.

It should be noted that, FIG. 1 only shows as an example in which a 4×4 array of acoustic transducer elements Q, and each of the acoustic transducer elements includes eight acoustic transducer units 12. In practical application, the number and the arrangement of the acoustic transducer elements Q and the number and the arrangement of the acoustic transducer units 12 in each acoustic transducer element Q can be designed as needs.

In addition, FIG. 3 only shows an embodiment in which the switch 11 is the MEMS switch shown in FIG. 5, and the technical solutions of the present disclosure are not limited thereto. Moreover, the switch 11 as shown in FIG. 3 further includes a first filling pattern 18, and the acoustic transducer unit 12 further includes a second filling pattern 19. The first filling pattern 18 and the second filling pattern 19 will be described in the following description.

In some embodiments, the acoustic transducer unit 12 is a capacitive micromechanical ultrasonic transducer (CMUT) unit. In some embodiments, the acoustic transducer unit 12 includes: a second support pattern 16, a second vibration film 13, a top electrode 14 and a bottom electrode 15. The second support pattern 16 is located on the base substrate 8 and forms an enclosed second vibration cavity. The second vibration film 13 is located on a side of the second support pattern 16 distal to the base substrate 8. The top electrode 14 is located on a side of the second vibration film 13 distal to the base substrate 8, and the bottom electrode 15 is located in the second vibration cavity and is electrically connected to a signal input terminal of an acoustic transducer unit 12. The bottom electrode 15 serves as the signal input terminal of the acoustic transducer unit 12. The acoustic transducer unit 12 has two operating states, i.e., a transmitting state and a receiving state.

When the acoustic transducer unit 12 is in the transmitting state, a forward DC bias voltage VDC is applied between the top electrode 14 and the bottom electrode 15, so that the second vibration film 13 is deformed to bend downward (i.e., toward the bottom electrode 15) under the electrostatic action. Based on the above, an AC voltage VAC with a certain frequency f (the magnitude of f is set according to actual needs) is applied between the top electrode 14 and the bottom electrode 15 to excite the second vibration film 13 to reciprocate significantly (i.e., to move backwards and forwards in a direction toward to the bottom electrode 6 and a direction away from the bottom electrode 6) so as to realize the conversion of electric energy into mechanical energy. The second vibration film 13 radiates energy to a medium environment to generate sound waves. Part of the ultrasonic waves may be reflected by a surface of an object to be tested and return to the acoustic transducer unit 12, so as to be received and tested by the acoustic transducer unit 12.

When the acoustic transducer unit 12 is in the receiving state, only a DC bias voltage is applied between the top electrode 14 and the bottom electrode 15. The second vibration film 13 reaches a static balance under the action of an electrostatic force and a film restoring force. When sound waves are received by the second vibration film 13, the second vibration film 13 is excited to vibrate, so that a distance between the top electrode 14 and the bottom electrode 15 in the cavity changes, which leads to a change of capacitance between plates, thereby generating a detectable electrical signal. The electrical signal can be transmitted to an external signal processing circuit through the switch 11, so as to be processed by the external signal processing circuit to obtain information related to the sound waves received by the second vibration film 13. The processing on electrical signal from the bottom electrode 15 by the external signal processing circuit belongs to conventional technical means in the art, and will not be described herein.

In the embodiments of the present disclosure, the acoustic transducer unit has two operation modes, i.e., a collapsing mode and a non-collapsing mode. In the non-collapsing mode, a distance by which the top electrode 14 is pulled down is controlled by controlling a magnitude of the applied DC bias voltage, so that the second vibration film 13 is spaced apart from the bottom electrode 15. In the collapsing mode, the distance by which the top electrode 14 is pulled down is controlled by controlling the magnitude of the applied DC bias voltage, so that a central portion of the second vibration film 13 is contact with the bottom electrode 15. In this way, the second vibration film may have two different operation frequencies, thereby increasing a bandwidth of the second vibration film 13, and increasing an operation range of CMUT. When the central portion of the second vibration film 13 is in contact with the bottom electrode 15, a distance between the top electrode 14 and the bottom electrode 15 is decreased, and the capacitance between the top electrode 14 and the bottom electrode 15 is increased; in such case, a small vibration generated by the vibration film 13 can result in a large current on the bottom electrode 15, which facilitates improving the sensitivity of the acoustic transducer unit 12.

Figure 9:
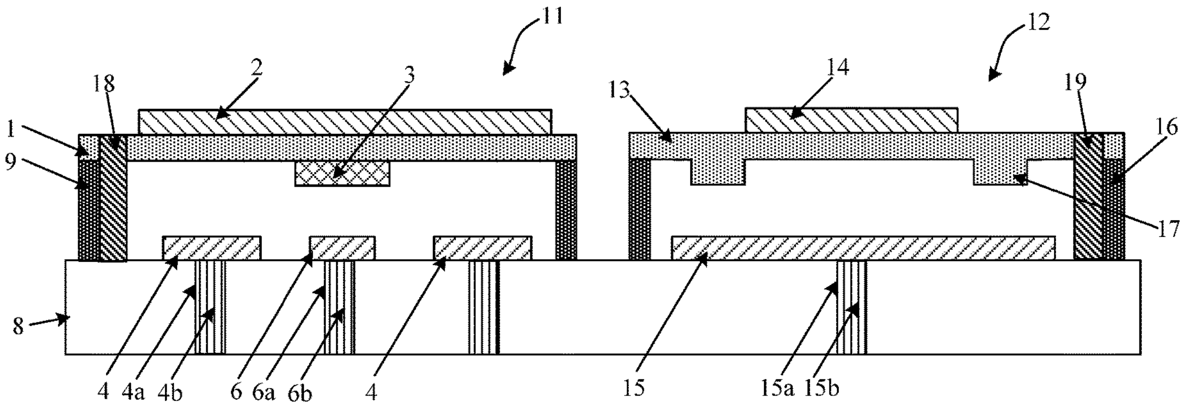
FIG. 9 is another sectional view taken along line A-A' of FIG. 2.

FIG. 9 is another sectional view taken along line A-A' of FIG. 2. The embodiment shown in FIG. 9 differs from the embodiment shown in FIG. 2 in that the second control electrode 4, the first transmission electrode 5 and the second transmission electrode 6 in the embodiments shown in FIG. 9 are all led out to the back surface of the base substrate 8 through the conductive vias in the base substrate 8.

In some embodiments, a fourth via 15*a* is formed in a portion of the base substrate 8 corresponding to the bottom electrode 15, and a fourth conductive lead wire 15*b* is formed in the fourth via 15*a*. One end of the fourth conductive lead wire 15*b* is connected to the bottom electrode 15, and the other end of the fourth conductive lead wire 15*b* extends onto a surface of the base substrate 8 distal to the bottom electrode 15 (i.e. the back surface of the base substrate 8). In this way, the lengths of the lead wires can be decreased, the parasitic effect can be reduced, and a signal-to-noise ratio of the electric signal output from the acoustic transducer unit 12 can be improved.

Figure 10:
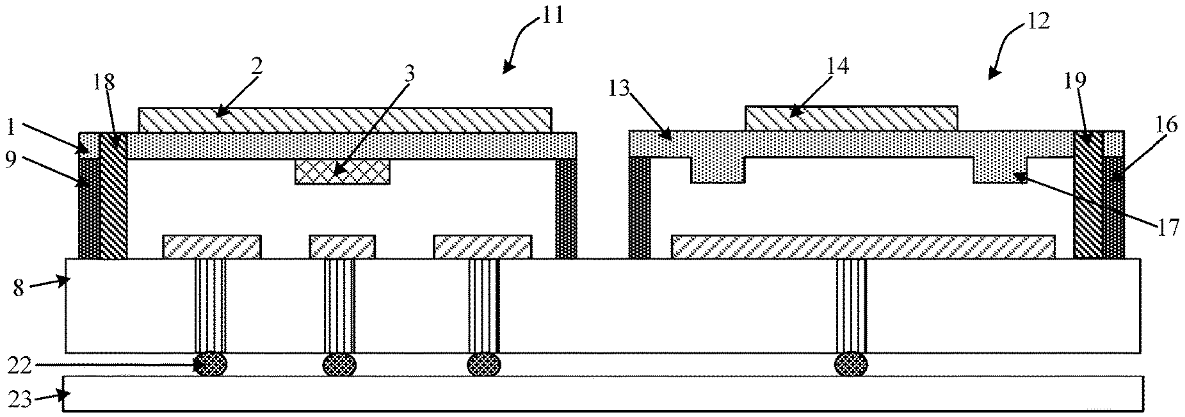
FIG. 10 is a sectional view illustrating that an acoustic transducer substrate is packaged according to an embodiment of the present disclosure.

FIG. 10 is a sectional view illustrating that an acoustic transducer substrate is packaged according to an embodiment of the present disclosure. As shown in FIG. 10, when the electrodes on the acoustic transducer substrate extend onto the back surface of the base substrate 8 through the conductive vias, the MEMS switches 11 and the acoustic transducer units 12 may be packaged through the BGA technology. Specifically, the ends of all the lead wires on the back surface of the base substrate 8 are provided with solder balls 22, and are fixed to a printed circuit board 23 through the solder balls 22. For example, the first lead wire 5*b* connected to the first transmission electrode 5 is electrically connected to an external control signal line through a circuit on the printed circuit board 23, so as to electrically connect the first transmission electrode 5 to the control signal line; and the second lead wire 6*b* connected to the second transmission electrode 6 is connected to the fourth lead wire 15*b* through a circuit on the printed circuit board 23, so as to electrically connect the second transmission electrode 6 to the bottom electrode 15.

In some embodiments, the first support pattern 9 and the second support pattern 16 are formed in the same layer, the first vibration film 1 and the second vibration film 13 are formed in the same layer, the first transmission electrode 5, the second transmission electrode 6, the second control electrode 4 and the bottom electrode 15 are formed in the same layer, and the first control electrode 2 and the top electrode 14 are formed in the same layer. That is to say, the MEMS switch 11 and the acoustic transducer unit 12 can be simultaneously manufactured by the same processes, which can effectively shorten production cycle.

Continue with reference to FIGS. 1 and 10, in some embodiments, the acoustic transducer unit 12 further includes: at least one protrusion 17 located on a surface of the second vibration film 13 proximal to the base substrate 8. In the embodiments of the present disclosure, by forming the protrusion 17, it can prevent the second vibration film 13 from being in large-area contact with the bottom electrode 15 when the second vibration film 13 falls due to gravity during a process of removing sacrificial layers to form the second vibration cavity, so that the second vibration film 13 may be prevented from being adhered to the bottom electrode 15.

In some embodiments, the protrusion 17 and the second vibration film 13 are formed as one piece.

Figure 11A:
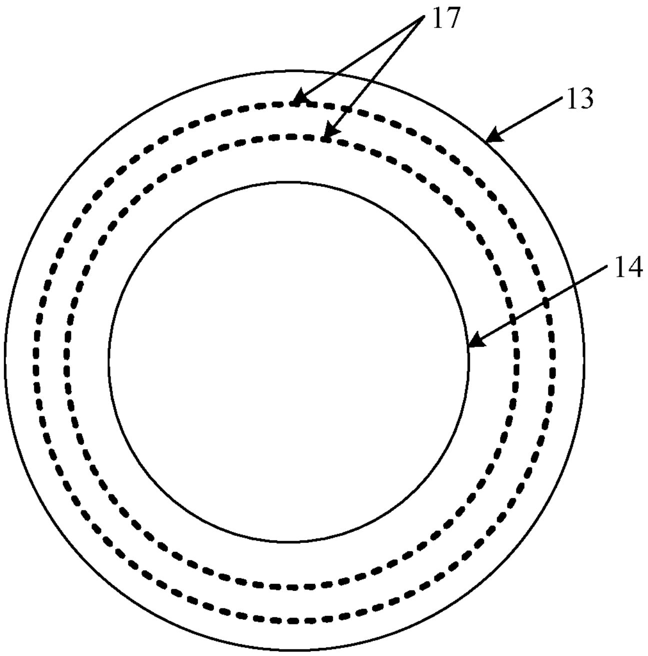
FIG. 11*a* is a top perspective view showing an acoustic transducer unit according to an embodiment of the present disclosure.

FIG. 11*a* is a top perspective view showing an acoustic transducer unit according to an embodiment of the present disclosure. As shown in FIG. 11*a*, in some embodiments, the protrusion 17 has a shape of ring in cross-section view parallel to the base substrate 8, and the top electrode 14 is located within a region defined by the ring.

Figure 11B:
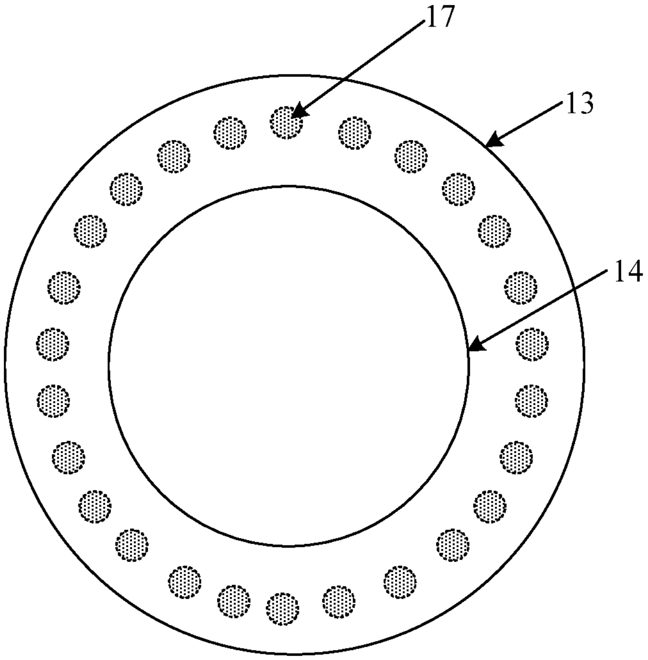
FIG. 11*b* is a top perspective view showing an acoustic transducer unit according to another embodiment of the present disclosure.

FIG. 11*b* is a top perspective view showing an acoustic transducer unit according to another embodiment of the present disclosure. As shown in FIG. 11*b*, in some embodiments, the acoustic transducer unit includes a plurality of protrusions 17. The protrusion 17 has a shape of circular in a cross-section view parallel to the base substrate 8. The plurality of protrusions 17 are arranged along a ring path, and the top electrode 14 is located within a region defined by the ring path.

It should be noted that FIGS. 11*a* and 11*b* merely show the examples in which the rings are "circular rings", and the top electrode 14 has a circular shape in the section view parallel to the base substrate 8. However, those examples are designed just for the convenience of actual production and processing, and the technical solutions of the present disclosure are not limited thereto.

An embodiment of the present disclosure further provides a method for manufacturing an acoustic transducer, which can be used to manufacture the acoustic transducer provided by the foregoing embodiments. The manufacturing method includes: forming switches and acoustic transducer units on a base substrate.

In the embodiments of the present disclosure, gating of the acoustic transducer elements in the two-dimensional array may be realized by providing the switches in the acoustic transducer elements, so that the different acoustic transducer elements on the acoustic transducer substrate may share a single control signal line and a single external signal processing circuit, thereby effectively decreasing the number of the external signal processing circuits included in the ASIC, and further reducing the complexity and cost of the ASIC correspondingly.

Figure 12:
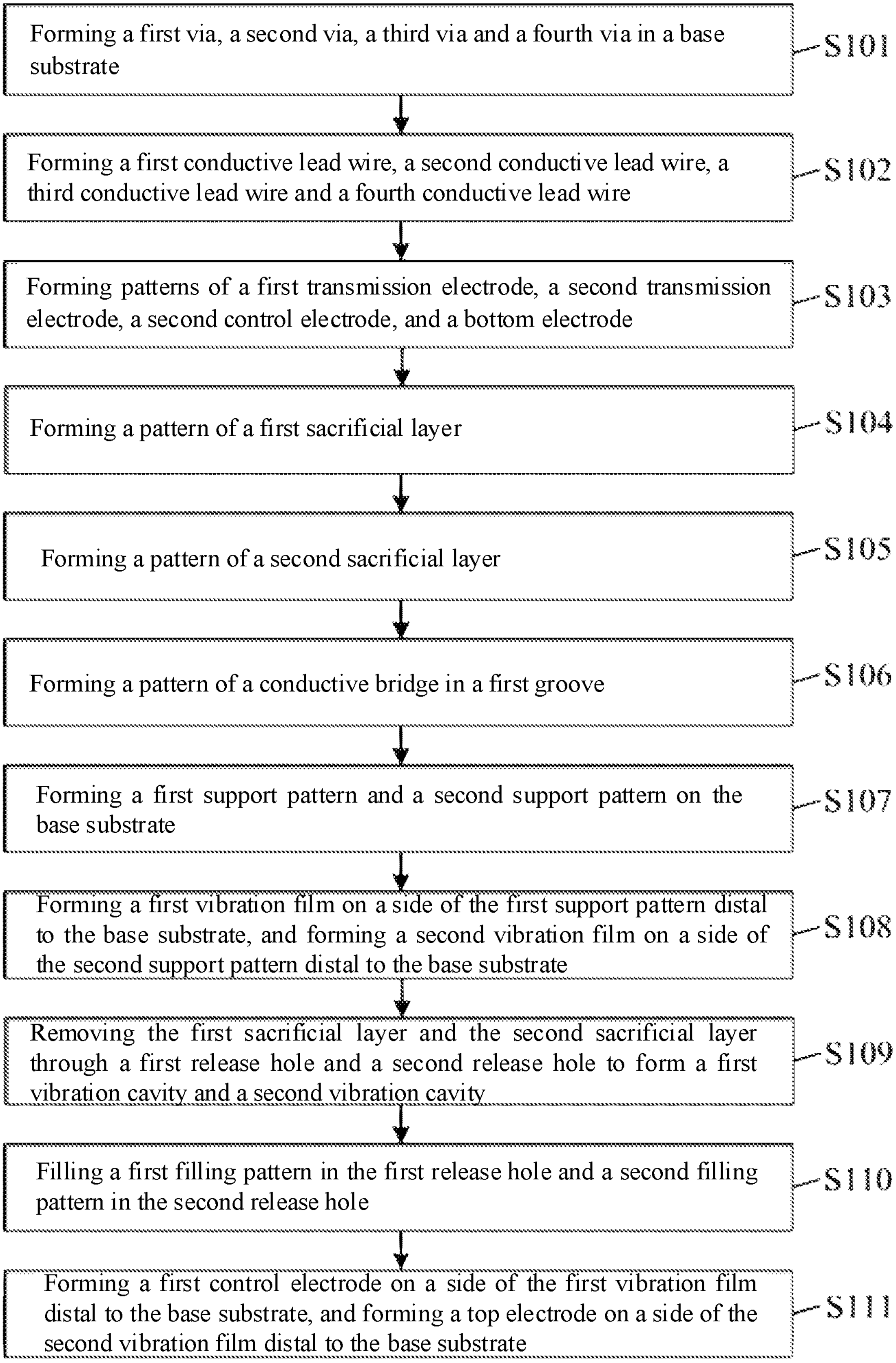
FIG. 12 is a flowchart illustrating a method for manufacturing an acoustic transducer substrate according to an embodiment of the present disclosure.
Figure 13A:
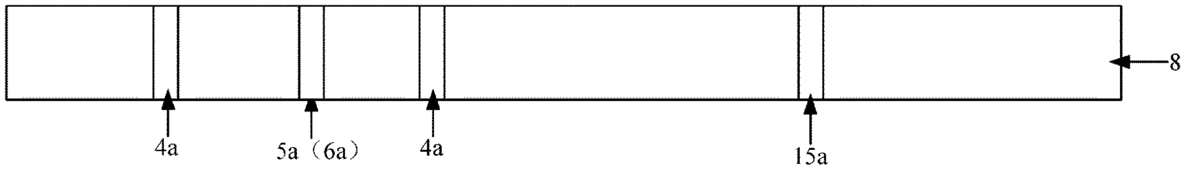
FIGS. 13A to 13J are sectional views illustrating intermediate structures during the manufacture of an acoustic transducer substrate.
Figure 13B:
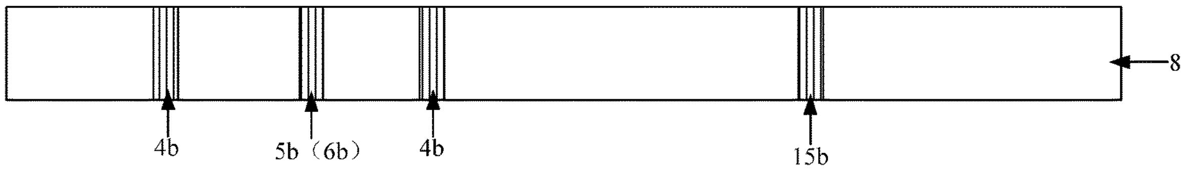
Figure 13C:
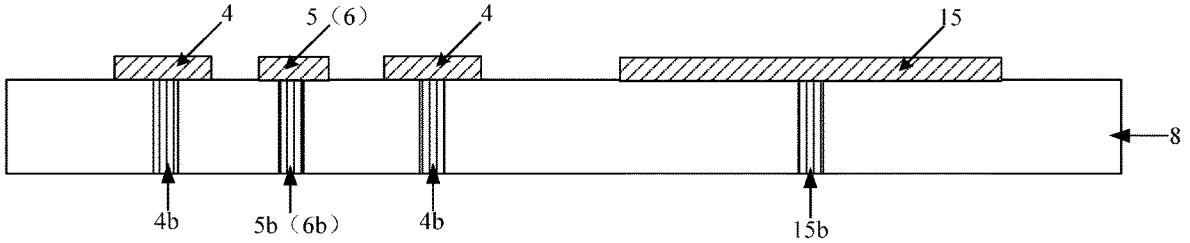
Figure 13D:
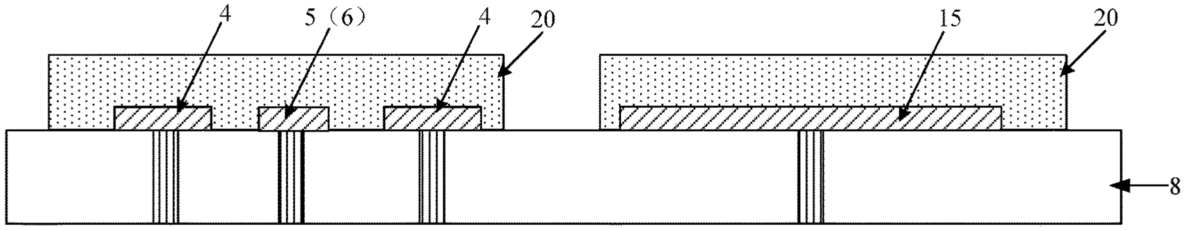
Figure 13E:
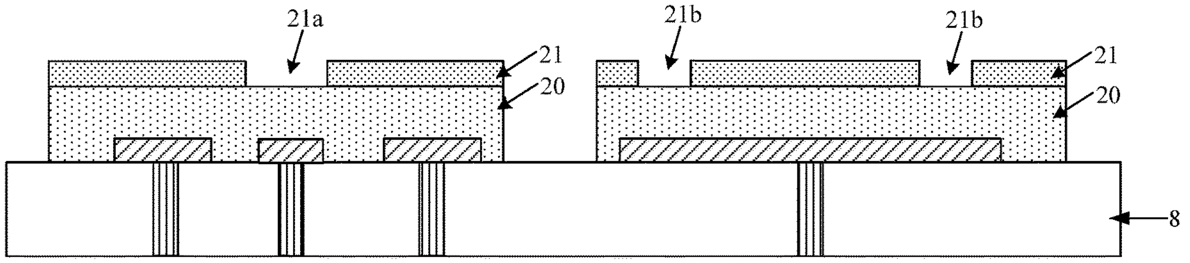
Figure 13F:
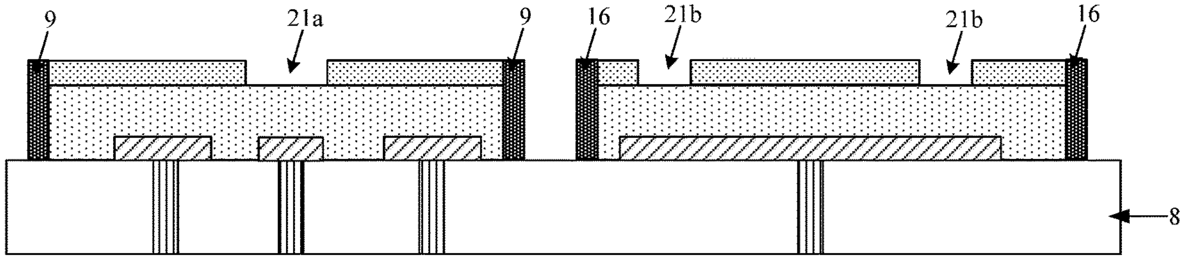
Figure 13G:
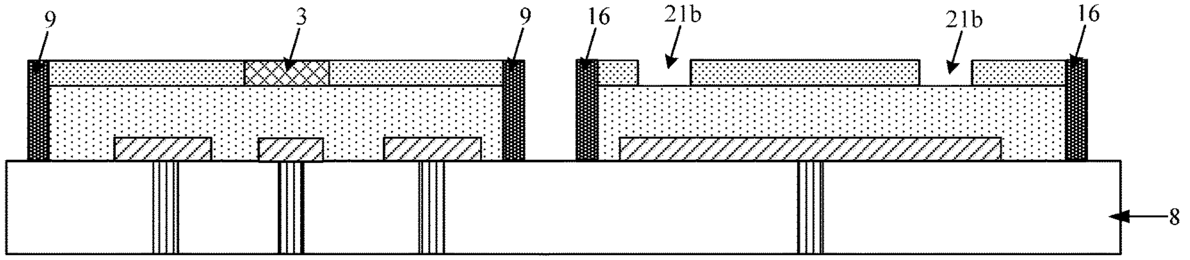
Figure 13H:
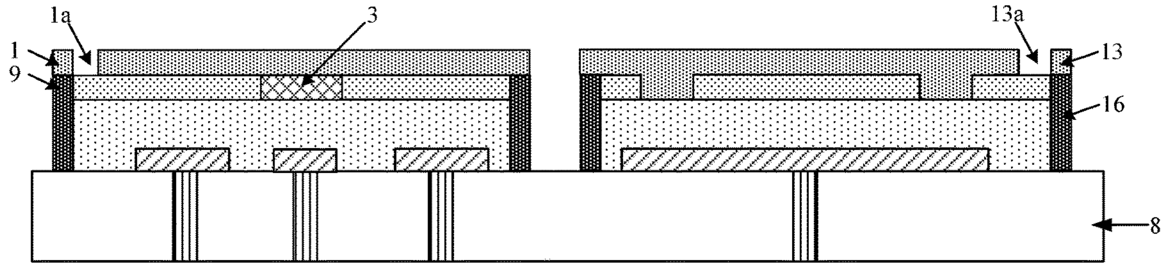
Figure 13I:
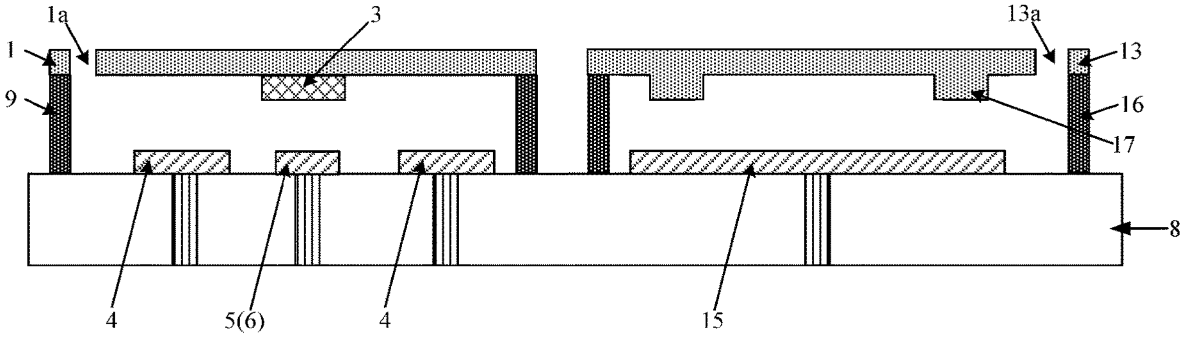
Figure 13J:
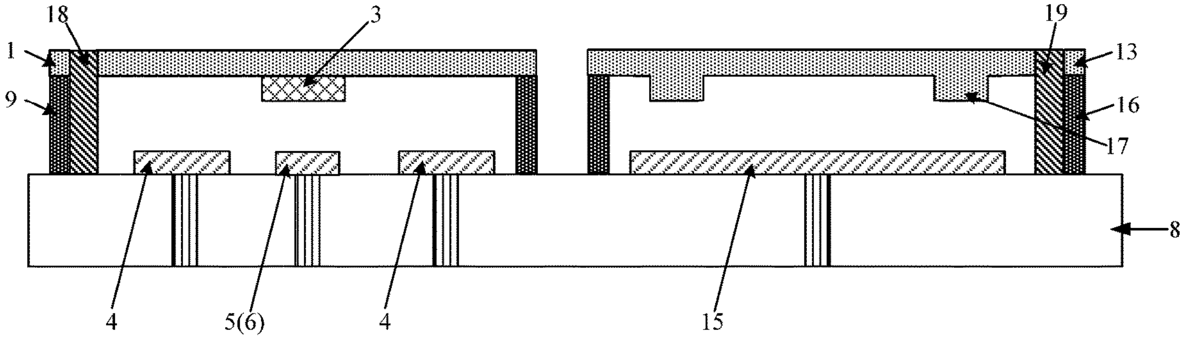

FIG. 12 is a flowchart illustrating a method for manufacturing an acoustic transducer substrate according to an embodiment of the present disclosure, and FIGS. 13A to 13J are sectional views illustrating the intermediate structures of the acoustic transducer substrate during the manufacture of the acoustic transducer substrate. As shown in FIGS. 12 to 13J, taking the switch and the acoustic transducer unit shown in FIG. 9 as an example, the manufacturing method includes steps S101 to S111.

At step S101, a first via, a second via, a third via and a fourth via are formed at the positions, where a first transmission electrode, a second transmission electrode, a second control electrode and a bottom electrode are to be formed, in a base substrate.

With reference to FIG. 13A, in some embodiments, the base substrate 8 is a glass substrate, and the first via 5*a*, the second via 6*a*, the third via 4*a* and the fourth via 15*a* may be formed by a TGV process.

At step S102, a first conductive lead wire, a second conductive lead wire, a third conductive lead wire and a fourth conductive lead wire are formed in the first via, the second via, the third via and the fourth via, respectively.

With reference to FIG. 13B, the first conductive lead wire 5*b*, the second conductive lead wire 6*b*, the third conductive lead wire 4*b*, and the fourth conductive lead wire 15*b* are formed in the first via 5*a*, the second via 6*a*, the third via 4*a*, and the fourth via 15*a* respectively by a deposition process. Two ends of the first conductive lead wire 5*b*, two ends of the second conductive lead wire 6*b*, two ends of the third conductive lead wire 4*b*, and two ends of the fourth conductive lead wire 15*b* respectively extend onto two opposite surfaces of the base substrate 8. The first conductive lead wire 5*b*, the second conductive lead wire 6*b*, the third conductive lead wire 4*b* and the fourth conductive lead wire 15*b* may be made of a metal material.

At step S103, patterns of the first transmission electrode, the second transmission electrode, the second control electrode, and the bottom electrode are formed on the base substrate.

With reference to FIG. 13C, a film of conductive material is first formed on the base substrate 8, and then is patterned to form the patterns of the first transmission electrode 5, the second transmission electrode 6, the second control electrode 4, and the bottom electrode 15.

At step S104, a pattern of a first sacrificial layer is formed on a side of the first transmission electrode, the second transmission electrode, the second control electrode and the bottom electrode distal to the base substrate.

With reference to FIG. 13D, a material of a first sacrificial layer 20 may be selected as needs, as long as the vibration films, the support patterns, and the electrodes cannot be damaged during the subsequent removal of first sacrificial layer 20. The material of the sacrificial layer may be a metal (e.g. aluminum, molybdenum, and copper), a metal oxide (e.g. ITO), or an insulating material (e.g. silicon dioxide, silicon nitride, and photoresist).

At step S105, a pattern of a second sacrificial layer is formed on a side of the first sacrificial layer distal to the base substrate. A first groove for accommodating a conductive bridge and a second groove for accommodating a protrusion are formed in the second sacrificial layer.

With reference to FIG. 13E, a material film of a second sacrificial layer 21 is first formed by a deposition process, and then is patterned to form a pattern of the second sacrificial layer 21. The first groove 21*a* for subsequently accommodating the conductive bridge 3 and the second grooves 21*b* for subsequently accommodating the protrusions 17 are formed on the second sacrificial layer 21.

A material of the second sacrificial layer 21 may be the same as or different from the material of the first sacrificial layer 20.

At step S106, a pattern of the conductive bridge is formed in the first groove.

With reference to FIG. 13F, a film of conductive material is first formed by a deposition process, and then is patterned to form a pattern of the conductive bridge 3 in the first groove 21*a*.

At step S107, a first support pattern and a second support pattern are formed on the base substrate.

With reference to FIG. 13G, a film of support material is first formed by a deposition process, and then is patterned to form patterns of the first support pattern 9 and the second support pattern 16. In some embodiments, a material of the film of support material may include silicon dioxide and/or silicon nitride.

It should be noted that, in some embodiments, the step S107 may be performed before the step S103, or before the step S104, or before the step S105, or before the step S106. Those modifications should also fall within the scope of the present disclosure.

In order to ensure the flatness of the subsequently formed first vibration film 1, a distance between a surface of the first support pattern 9 distal to the base substrate 8 and the base substrate 8, a distance between a surface of the second sacrificial layer distal to the base substrate 8 and the base substrate 8, and a distance between a surface of the conductive bridge 3 distal to the base substrate 8 and the base substrate 8 should be equal to each other as much as possible.

At step S108, a pattern of a first vibration film is formed on a side of the first support pattern distal to the base substrate, and patterns of a second vibration film and the protrusion are formed on a side of the second support pattern distal to the base substrate. A first release hole is formed in the first vibration film, and a second release hole is formed in the second vibration film.

With reference to FIG. 13H, a film of vibration film material is first formed by a deposition process, and then is patterned to form patterns of the first vibration film 1, the second vibration film 13 and the protrusions 17. The first release hole 1*a* and a second release hole 13*a* are formed in the first vibration film 1 and the second vibration film 13 respectively for subsequent removal of the first sacrificial layer 20 and the second sacrificial layer 21.

In some embodiments, a material of the film of vibration film material includes an organic resin material. In such case, in the process of forming the film of vibration film material, the film of vibration film material is filled in the second grooves 21*b*, and has a flat surface on a side of vibration film material distal to the base substrate 8. The second vibration film 13 and the protrusions 17 are formed as one piece by the patterning process.

At step S109, the first sacrificial layer and the second sacrificial layer are removed through the first release hole and the second release hole to form a first vibration cavity and a second vibration cavity.

With reference to FIG. 13I, the first sacrificial layer 20 and the second sacrificial layer 21 may be removed through the first release hole 1*a* and the second release hole 13*a* by a dry etching process or a wet etching process. The process for removing the first sacrificial layer 20 and the second sacrificial layer 21 is determined according to the materials of the first sacrificial layer 20 and the second sacrificial layer 21, as long as it is ensured that the vibration films, the support patterns and the electrodes cannot be damaged during the removal of the first sacrificial layer 20 and the second sacrificial layer 21.

At step S110, a first filling pattern for filling the first release hole and a second filling pattern for filling the second release hole are formed.

With reference to FIG. 13J, a film of filling material is first formed by a deposition process, and then is patterned to fill the first release hole 1*a* and the second release hole 13*a*. In order to ensure the flatness of the surfaces of the first vibration film 1 and the second vibration film 13, a distance between a surface of the first filling pattern 18 distal to the base substrate 8 and the base substrate 8 is equal to a distance between a surface of the first vibration film 1 distal to the base substrate 8 and the base substrate 8, and a distance between a surface of the second filling pattern 19 distal to the base substrate 8 and the base substrate 8 is equal to a distance between a surface of the second vibration film 13 distal to the base substrate 8 and the base substrate 8.

At step S111, a first control electrode is formed on a side of the first vibration film distal to the base substrate, and a top electrode is formed on a side of the second vibration film distal to the base substrate.

With reference to FIG. 9, a film of conductive material is first formed by a deposition process, and then is patterned to form the first control electrode 2 on a side of the first vibration film 1 distal to the base substrate 8 and the top electrode 14 on a side of the second vibration film 13 distal to the base substrate 8.

It should be noted that the steps S101 and S102 are not needed and it is unnecessary to form the second grooves 21*b* in the step S105 in the case where the switch and the acoustic transducer unit as shown in FIG. 3 are formed.

It should be understood that the above embodiments are merely exemplary embodiments employed to illustrate the principles of the present disclosure, and the present disclosure is not limited thereto. Various changes and modifications may be made those skilled in the art without departing from the spirit and essence of the present disclosure, and should be considered to fall within the scope of the present disclosure.

What is claimed is:

1. An acoustic transducer, comprising: a base substrate and a plurality of acoustic transducer elements on the base substrate, wherein the acoustic transducer element comprises: a switch and an acoustic transducer unit;

a first terminal of the switch is electrically connected to a control signal line, and a second terminal of the switch is electrically connected to the acoustic transducer unit, the switch and the acoustic transducer unit being located in a same acoustic transducer element, and the switch is configured to control connection and disconnection between the acoustic transducer unit and the control signal line, wherein the switch comprises a MEMS switch, and the MEMS switch comprises:

a first support pattern on the base substrate and defining an enclosed first vibration cavity;

a first vibration film on a side of the first support pattern distal to the base substrate;

a first transmission electrode and a second transmission electrode on a side of the base substrate proximal to the first vibration film, spaced apart from each other, and electrically connected to the first terminal and the second terminal of the switch respectively;

a conductive bridge on a side of the first vibration film proximal to the base substrate;

a first control electrode on a side of the first vibration film distal to the base substrate;

a second control electrode in the first vibration cavity, and configured to pull the first control electrode down when a driving voltage is applied to second control electrode, so as to drive the first vibration film and the conductive bridge to move such that the conductive bridge is in contact with the first and second transmission electrodes.

2. The acoustic transducer of claim 1, further comprising an external signal processing circuit; and the first terminal of the switch is connected to a same external signal processing circuit through the control signal line.

3. The acoustic transducer of claim 1, wherein the first transmission electrode, the second transmission electrode, and the second control electrode are in a same layer.

4. The acoustic transducer of claim 1, wherein the second control electrode comprises: a first sub-electrode and a second sub-electrode arranged along a first direction and spaced apart from each other; and the first and second transmission electrodes are arranged along a second direction and between the first sub-electrode and the second sub-electrode.

5. The acoustic transducer of claim 1, wherein a first via and a second via are in portions of the base substrate corresponding to the first transmission electrode and the second transmission electrode respectively, and a first conductive lead wire and a second conductive lead wire are in the first via and the second via respectively, one end of the first conductive lead wire is connected to the first transmission electrode, and the other end of the first conductive lead wire extends onto a surface of the base substrate distal to the first transmission electrode, and one end of the second conductive lead wire is connected to the second transmission electrode, and the other end of the second conductive lead wire extends onto a surface of the base substrate distal to the second transmission electrode.

6. The acoustic transducer of claim 1, wherein a third via is in a portion of the base substrate corresponding to the second control electrode, a third conductive lead wire is in the third via, one end of the third conductive lead wire is connected to the second control electrode, and the other end of the third conductive lead wire extends onto a surface of the base substrate distal to the second control electrode.

7. The acoustic transducer of claim 1, wherein the acoustic transducer unit comprises:

a second support pattern on the base substrate and defining an enclosed second vibration cavity;

a second vibration film on a side of the second support pattern distal to the base substrate;

a top electrode on a side of the second vibration film distal to the base substrate; and a bottom electrode in the second vibration cavity and electrically connected to the second terminal of the switch.

8. The acoustic transducer of claim 7, wherein the switch comprises a MEMS switch, and the MEMS switch comprises: a first support pattern, a first vibration film, a first transmission electrode, a second transmission electrode, a conductive bridge, a first control electrode and a second control electrode;

the first support pattern is in the same layer as the second support pattern;

the first vibration film is in the same layer as the second vibration film;

the first and second transmission electrodes, the second control electrode and the bottom electrode are in a same layer; and the first control electrode is in the same layer as the top electrode.

9. The acoustic transducer of claim 7, wherein a fourth via is in a portion of the base substrate corresponding to the bottom electrode, a fourth conductive lead wire is in the fourth via, one end of the fourth conductive lead wire is connected to the bottom electrode, and the other end of the fourth conductive lead wire extends onto a surface of the base substrate distal to the bottom electrode.

10. The acoustic transducer of claim 7, wherein the acoustic transducer unit further comprises at least one protrusion on a surface of the second vibration film proximal to the base substrate.

11. The acoustic transducer of claim 10, wherein the protrusion has a shape of a ring in a cross-section view parallel to the base substrate, and the top electrode is in a region defined by the ring; or the acoustic transducer unit comprises a plurality of protrusions, each of plurality of protrusions has a shape of circular in a cross-section view parallel to the base substrate, the plurality of protrusions are arranged along a ring, and the top electrode is in a region defined by the ring.

12. A method for manufacturing the acoustic transducer of claim 1, comprising:

forming the switch and the acoustic transducer unit on the base substrate.

13. The method of claim 12, wherein the switch comprises: a MEMS switch, and the MEMS switch comprises: a first support pattern, a first vibration film, a first transmission electrode, a second transmission electrode, a conductive bridge, a first control electrode and a second control electrode;

the acoustic transducer unit comprises a second support pattern, a second vibration film, a top electrode and a bottom electrode;

forming the switch and the acoustic transducer unit on the base substrate comprises:

forming patterns of the first transmission electrode, the second transmission electrode, the second control electrode, and the bottom electrode on the base substrate;

forming a pattern of a first sacrificial layer on a side of the first transmission electrode, the second transmission electrode, the second control electrode and the bottom electrode distal to the base substrate;

forming a pattern of a second sacrificial layer on a side of the first sacrificial layer distal to the base substrate;

forming a first groove for subsequently accommodating a conductive bridge in the second sacrificial layer;

forming a pattern of the conductive bridge in the first groove;

forming the first support pattern and the second support pattern on the base substrate;

forming a pattern of the first vibration film on a side of the first support pattern distal to the base substrate, and forming a pattern of the second vibration film on a side of the second support pattern distal to the base substrate;

forming a first release hole in the first vibration film, and forming a second release hole in the second vibration film;

removing the first sacrificial layer and the second sacrificial layer through the first release hole and the second release hole to form a first vibration cavity and a second vibration cavity;

filling a first filling pattern in the first release hole, and filling a second filling pattern in the second release hole; and forming the first control electrode on a side of the first vibration film distal to the base substrate, and forming the top electrode on a side of the second vibration film distal to the base substrate.

14. The method of claim 13, wherein the acoustic transducer unit further comprises a protrusion; and the method further comprises:

forming a second groove for subsequently accommodating the protrusion in the second sacrificial layer during a formation of the pattern of the second sacrificial layer;

forming the pattern of the first vibration film on the side of the first support pattern distal to the base substrate and forming the pattern of the second vibration film on the side of the second support pattern distal to the base substrate further comprises: forming the protrusion in the second groove.

15. The method of claim 13, before forming the patterns of the first transmission electrode, the second transmission electrode, the second control electrode, and the bottom electrode on the base substrate, further comprising:

forming a first via, a second via, a third via and a fourth via in portions of the base substrate corresponding to the first transmission electrode, the second transmission electrode, the second control electrode and the bottom electrode to be formed; and forming a first conductive lead wire, a second conductive lead wire, a third conductive lead wire and a fourth conductive lead wire in the first via, the second via, the third via and the fourth via respectively, such that each of two ends of the first conductive lead wire, two ends of the second conductive lead wire, two ends of the third conductive lead wire, and two ends of the fourth conductive lead wire extend onto two opposite surfaces of the base substrate respectively.

* * * * *